United States Patent
Zhou et al.

(10) Patent No.: US 11,011,064 B2
(45) Date of Patent: May 18, 2021

(54) SYSTEM AND METHOD FOR VEHICLE PLATOONING

(71) Applicant: Denso International America, Inc., Southfield, MI (US)

(72) Inventors: Yumeng Zhou, Southfield, MI (US); Jin Kurumisawa, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 209 days.

(21) Appl. No.: 16/292,862

(22) Filed: Mar. 5, 2019

(65) Prior Publication Data
US 2020/0286387 A1 Sep. 10, 2020

(51) Int. Cl.
| | | |
|---|---|---|
| *G08G 1/00* | (2006.01) | |
| *G08G 1/16* | (2006.01) | |
| *G05D 1/02* | (2020.01) | |
| *G05D 1/00* | (2006.01) | |

(52) U.S. Cl.
CPC ............. *G08G 1/22* (2013.01); *G05D 1/0088* (2013.01); *G05D 1/0293* (2013.01); *G05D 1/0295* (2013.01); *G08G 1/162* (2013.01); *G08G 1/166* (2013.01); *G08G 1/167* (2013.01); *G05D 2201/0213* (2013.01)

(58) Field of Classification Search
CPC .......... G08G 1/22; G08G 1/162; G08G 1/166; G08G 1/167; G05D 1/0088; G05D 1/0293; G05D 1/0295; G05D 2201/0213
See application file for complete search history.

(56) References Cited

U.S. PATENT DOCUMENTS

| | | | | |
|---|---|---|---|---|
| 5,892,855 A | * | 4/1999 | Kakinami et al. | G06K 9/36 382/291 |
| 6,597,981 B2 | | 7/2003 | Nishira et al. | |
| 7,272,482 B2 | * | 9/2007 | Kubota | G08G 1/00 701/96 |

(Continued)

FOREIGN PATENT DOCUMENTS

| | | |
|---|---|---|
| CN | 205149852 U | 4/2016 |
| GB | 2551248 A | 12/2017 |

*Primary Examiner* — Adam R Mott
*Assistant Examiner* — Frank T Glenn, III
(74) *Attorney, Agent, or Firm* — Christopher G. Darrow; Darrow Mustafa PC

(57) ABSTRACT

In one embodiment, example systems and methods related to vehicle platooning are provided. Vehicles are equipped with a vehicle platooning system that allows the vehicles to exchange messages related to vehicle platooning. When a following vehicle desires to follow a leading vehicle, the following vehicle sends a request to the leading vehicle, and the leading vehicle sends the following vehicle information such as its current speed. The following vehicle may then use the information, along with sensor data such as images of the rear of the leading vehicle, to follow the leading vehicle from a following distance. When the leading vehicle desires to change lanes, the leading vehicle sends a message to the following vehicle to determine if the following vehicle is able to change lanes. If the following vehicle determines that it can change lanes (i.e., the lane is clear from other vehicles or objects), the following vehicle can send a message to the leading vehicle indicating that it can change lanes. The leading and following vehicles may then change lanes at approximately the same time.

21 Claims, 15 Drawing Sheets

(56) References Cited

U.S. PATENT DOCUMENTS

| | | | | |
|---|---|---|---|---|
| 7,454,273 | B2* | 11/2008 | Hoshaw | G06F 7/00 |
| | | | | 701/36 |
| 7,612,658 | B2* | 11/2009 | Stopczynski | B60Q 1/00 |
| | | | | 340/436 |
| 8,352,111 | B2* | 1/2013 | Mudalige | G06F 19/00 |
| | | | | 701/24 |
| 9,182,764 | B1* | 11/2015 | Kolhouse et al. | G06F 19/00 |
| 10,235,875 | B2* | 3/2019 | Wieskamp et al. | G06F 15/173 |
| 10,755,580 | B2* | 8/2020 | McQuillen et al. | H04B 1/713 |
| 2010/0256835 | A1 | 10/2010 | Mudalige | |
| 2013/0173232 | A1* | 7/2013 | Meis et al. | G06F 17/50 |
| 2016/0054735 | A1 | 2/2016 | Switkes et al. | |
| 2017/0011633 | A1 | 1/2017 | Boegel | |
| 2017/0369055 | A1 | 12/2017 | Saigusa et al. | |
| 2018/0210461 | A1 | 7/2018 | Cremona et al. | |
| 2018/0239352 | A1* | 8/2018 | Wang et al. | G05D 1/00 |
| 2019/0096248 | A1* | 3/2019 | Liu et al. | G08G 1/0962 |
| 2019/0193738 | A1* | 6/2019 | Oh et al. | B60W 30/18 |
| 2019/0250639 | A1* | 8/2019 | Xu et al. | G05D 1/02 |

* cited by examiner

SYSTEM AND METHOD FOR VEHICLE PLATOONING

TECHNICAL FIELD

The subject matter described herein relates, in general, to systems and methods for vehicle platooning, and, in particular, to systems and methods for performing certain actions while vehicle platooning such as changing lanes, highway merging, and responding to traffic lights at intersections.

BACKGROUND

Vehicle platooning is where a lead or first vehicle is followed by one or more other vehicles. Typically, the vehicles in the platoon line up sequentially behind the lead vehicle with a distance between each vehicle that is known as the following distance.

Vehicle platooning may be particularly useful for autonomous and semi-autonomous vehicles. As may be appreciated, where one of the following vehicles is a semi-autonomous vehicle or autonomous vehicle, the following vehicle can focus on following the lead vehicle while relying on the lead vehicle for navigation and route selection. For example, a vehicle may be following a lead vehicle. The lead vehicle may be a fully autonomous vehicle or a driver controlled vehicle. The following vehicle may be a semi-autonomous vehicle that is capable of following the lead vehicle and maintaining the following distance without driver intervention, but may be otherwise incapable of performing actions such as navigation or route selection without driver intervention. By following the lead vehicle, the following vehicle is able to rely on the lead vehicle for the more complex driving tasks, which allows the driver to cede control of the following vehicle.

However, while vehicle platooning is useful, there are drawbacks associated with current methods and techniques for vehicle platooning. First, currently vehicle platoons that include autonomous or semi-autonomous vehicles are incapable of operating at high speeds. Second, when the leading vehicle determines to perform an advanced maneuver such as changing lanes, there currently exists no way for the leading vehicle to determine whether the following vehicles have sufficient space in the adjacent lane to also change lanes before the leading vehicle changes to the adjacent lane. Similar issues exists for vehicle platoons with respect to merging on highways and traveling through intersections.

SUMMARY

In one embodiment, example systems and methods related to vehicle platooning are provided. Vehicles are equipped with a vehicle platooning system that allows the vehicles to exchange messages related to vehicle platooning. When a following vehicle desires to follow a leading vehicle, the following vehicle sends a request to the leading vehicle, and the leading vehicle sends the following vehicle information such as its current speed. The following vehicle may then use the information, along with sensor data such as images of the rear of the leading vehicle, to follow the leading vehicle from a following distance. When the leading vehicle desires to change lanes, the leading vehicle sends a message to the following vehicle to determine if the following vehicle is able to change lanes. If the following vehicle determines that it can change lanes (i.e., the lane is clear from other vehicles or objects), the following vehicle can send a message to the leading vehicle indicating that it can change lanes. The leading and following vehicles may then change lanes at approximately the same time. As will be described further in the application, the vehicle platooning system may allow for the synchronization of other vehicle operations such as highway merging, and traveling through intersections.

In one embodiment, a method for vehicle platooning is provided. The method includes: driving behind a first vehicle by a second vehicle, wherein the second vehicle includes an operator and is operating in a manual mode; determining to follow the first vehicle by the second vehicle; in response to the determination, transmitting a request to follow the first vehicle to the first vehicle from the second vehicle; in response to the request, receiving vehicle status data from the first vehicle; and using the vehicle status data to follow the first vehicle by the second vehicle, wherein the second vehicle maintains a following distance between the first vehicle and the second vehicle, and further wherein the second vehicle operates in one of an autonomous mode or a semi-autonomous mode while following the first vehicle.

In one embodiment, a method for vehicle platooning is provided. The method includes: receiving a request to follow at a first vehicle from a second vehicle, wherein the second vehicle is traveling behind the first vehicle; in response to receiving the request to follow, transmitting vehicle status data to the second vehicle from the first vehicle, wherein the second vehicle uses the vehicle status data to maintain a following distance between the first vehicle and the second vehicle; receiving a first message from the second vehicle at the first vehicle, the first message indicating that the second vehicle has lost the first vehicle; and in response to the first message, transmitting a location of the first vehicle from the first vehicle to the second vehicle.

In one embodiment, a system for vehicle platooning is provided. The system includes one or more processors and a memory communicably coupled to the one or more processors. The memory stores a following module including instructions that when executed by the one or more processors cause the one or more processors to: drive behind a first vehicle by a second vehicle, wherein the second vehicle includes an operator and is operating in a manual mode; determine to follow the first vehicle by the second vehicle; and in response to the determination, transmit a request to follow the first vehicle to the first vehicle from the second vehicle. The memory further stores a lane change module including instructions that when executed by the one or more processors cause the one or more processors to: receive a first message from the first vehicle by the second vehicle, wherein the message indicates that the first vehicle has determined to change lanes from a current lane to an adjacent lane, and further wherein the first vehicle and the second vehicle are both traveling in the current lane; determine that the adjacent lane is clear for the second vehicle; in response to the determination, transmit a second message to the first vehicle from the second vehicle, wherein the second message indicates that the adjacent lane is clear for the second vehicle; and change lanes to the adjacent lane from the current lane by the second vehicle, wherein the second vehicle changes lanes to the adjacent lane from the current lane at approximately the same time as the first vehicle

BRIEF DESCRIPTION OF THE DRAWINGS

The accompanying drawings, which are incorporated in and constitute a part of the specification, illustrate various systems, methods, and other embodiments of the disclosure.

It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with vehicle platooning are disclosed. As described above a vehicle platoon may be two or more vehicles where one vehicle is the leader vehicle, and the other vehicles in the platoon are following vehicles. The vehicles in the platoon may be traditional vehicles (i.e., vehicles controlled by an operator or driver), or may be autonomous or semi-autonomous vehicles. As used herein a semi-autonomous vehicle may be a vehicle that may, under certain circumstances, be controlled completely or partially by one or more autonomous driving systems associated with the vehicle. However, a semi-autonomous vehicle may require that a human driver or operator be available to take control of the vehicle when necessary. An autonomous vehicle, on the other hand, may be a vehicle that is capable of being completely controlled by one autonomous driving systems, and does not require a human driver or operator.

Vehicle platoons provide several benefits with respect to semi-autonomous vehicles. As noted above semi-autonomous vehicles may lack the ability to completely control their operating without some input from a driver or operator. However, while in a vehicle platoon, semi-autonomous vehicles may rely on the leader vehicle to perform certain driving tasks such as navigation, route planning, and collision avoidance. For example, a semi-autonomous vehicle in a platoon may focus on following the leader vehicle, and on maintaining a following distance from the leader vehicle, and may rely on the leader vehicle to navigate and avoid road obstacles. By relying on the leader vehicle for certain vehicle functions, the follower vehicles may allow their operators or drivers to hand off more control than was previously possible.

However, as noted above, current methods for vehicle platooning are unable to operate at higher speeds making them impractical for use on highways or other roads associated with high speed driving. Furthermore, current methods for vehicle platooning have trouble handling complicated vehicle maneuvers such as changing lanes or merging into traffic.

Figure 1:
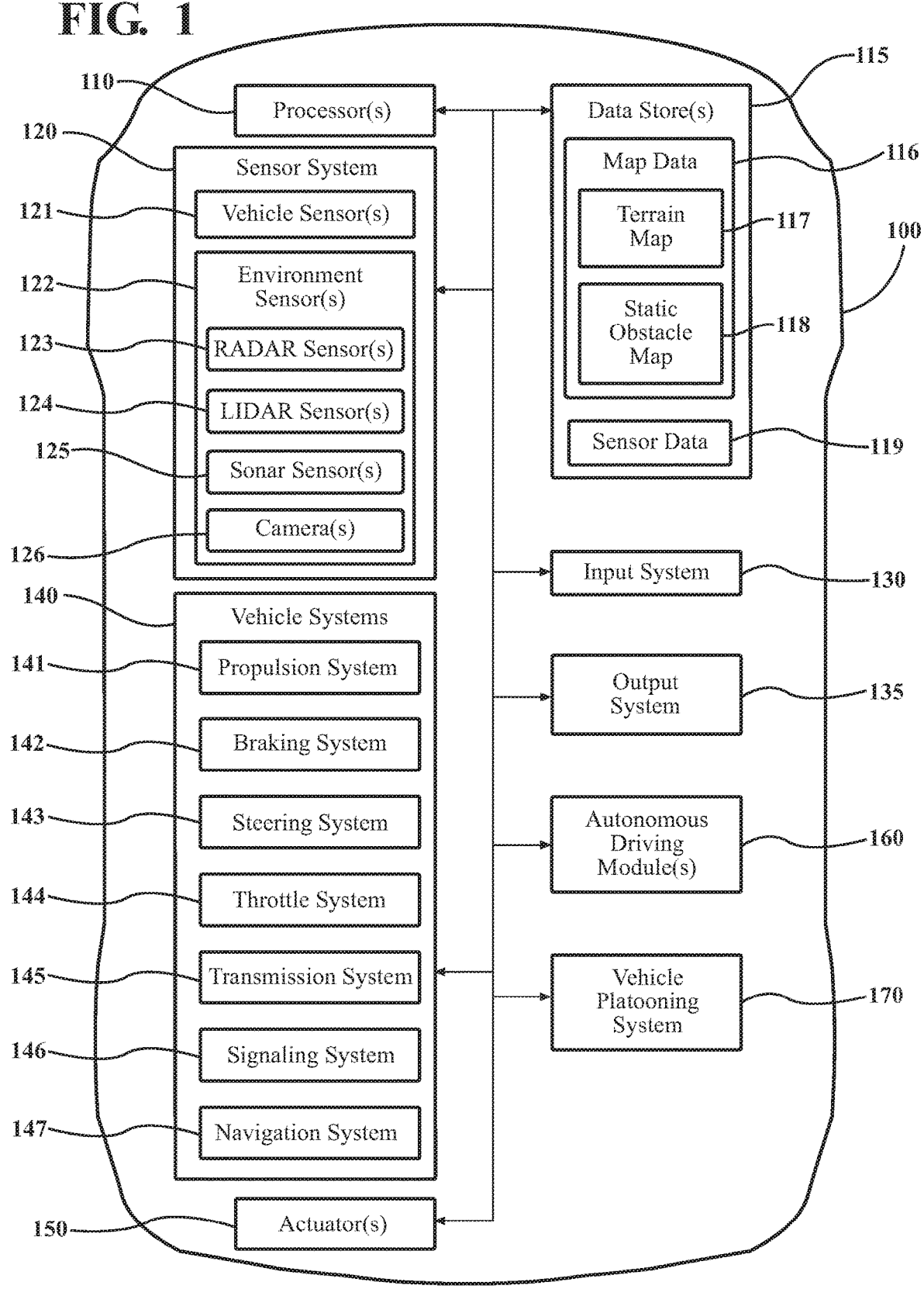
FIG. 1 illustrates one embodiment of a vehicle within which systems and methods disclosed herein may be implemented.

Referring to FIG. 1 is shown an example vehicle 100 capable of implementing the various systems and methods described herein. The vehicle 100 may be an autonomous or semi-autonomous vehicle. The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a vehicle platooning system 170 that is implemented to perform methods and other functions as disclosed herein relating to performing operations related to vehicle platooning. The noted functions and methods will become more apparent with a further discussion of the figures.

Figure 2:
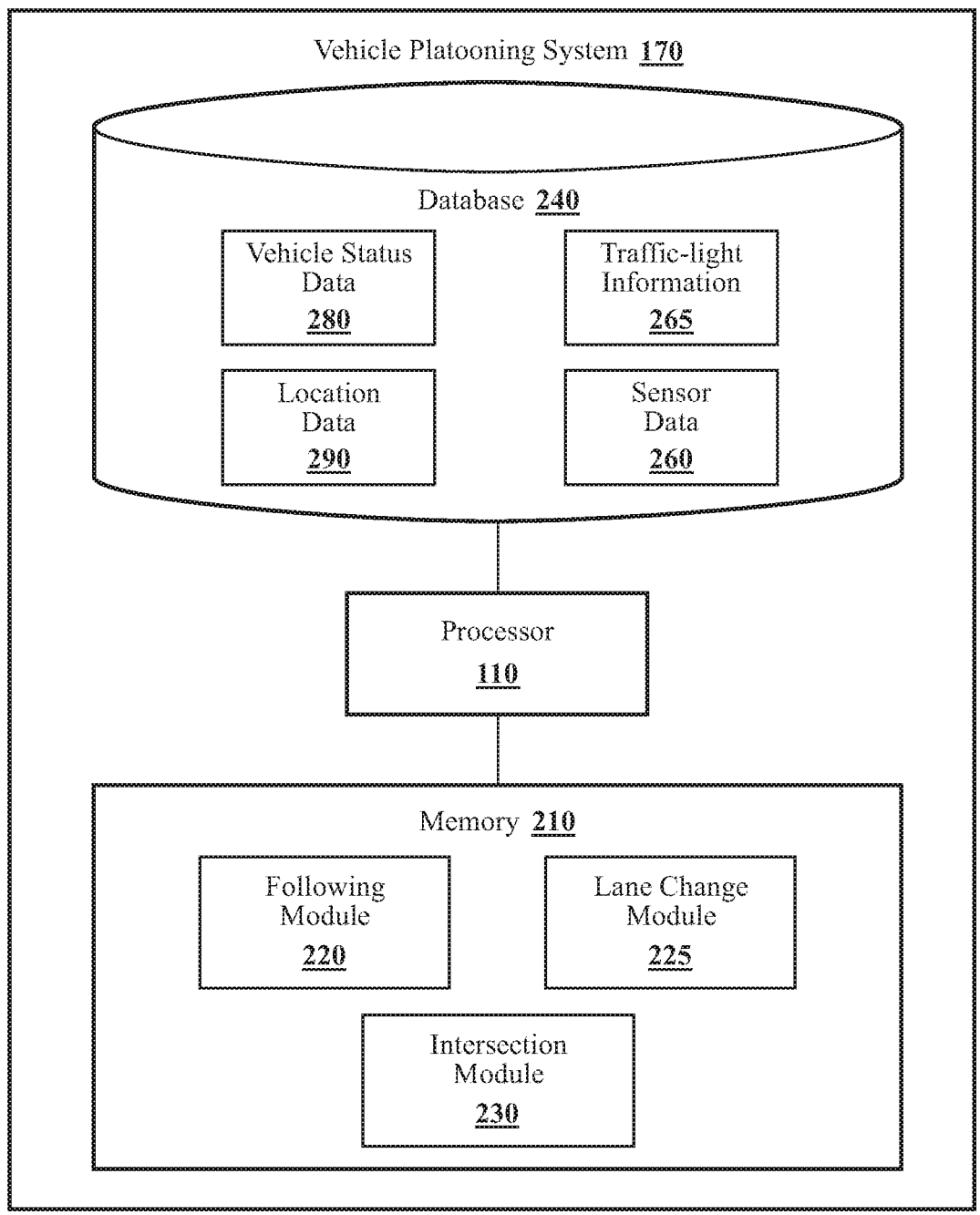
FIG. 2 illustrates one example of a vehicle platooning system as embodied herein.

With reference to FIG. 2, one embodiment of the vehicle platooning system 170 of FIG. 1 is further illustrated. The vehicle platooning system 170 is shown as including a processor 110 from the vehicle 100 of FIG. 1. Accordingly, the processor 110 may be a part of the vehicle platooning system 170, the vehicle platooning system 170 may include a separate processor from the processor 110 of the vehicle 100 or the vehicle platooning system 170 may access the processor 110 through a data bus or another communication path. It should be appreciated, that while the vehicle platooning system 170 is illustrated as being a single contained system within the vehicle 100, in various embodiments, the vehicle platooning system 170 is a distributed system that is comprised of components that can be provided as a centralized server, a cloud-based service, and so on. Moreover, the vehicle platooning system 170 described herein is not limited to vehicle-based implementations, but may be implemented using any general purpose computing device.

In one embodiment, the vehicle platooning system 170 includes a memory 210 that stores a following module 220, a lane change module 225, and an intersection module 230. More or fewer modules may be supported. The memory 210 is a read-only memory (ROM), a hard-disk drive, a flash memory, or other suitable memory for storing the modules 220, 225, and 230. The modules 220, 225, and 230 are, for example, computer-readable instructions that when executed by the processor 110 cause the processor 110 to perform the various functions disclosed herein. Moreover, as previously noted, in various embodiments, one or more aspects of the vehicle platooning system 170 are implemented as cloud-based services, and so on. Thus, one or more modules of the vehicle platooning system 170 may be located remotely from other components and may be implemented in a distributed manner.

Furthermore, in one embodiment, the vehicle platooning system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220, 225, and 230 in executing various functions. In one embodiment, the database 240 includes vehicle status data 280 along with, for example, other information that is used and/or generated by the modules 220, 225, and 230 such as location data 290, sensor data 260, and traffic-light information 265. Of course, in further embodiments, the various information may be stored within the memory 210 or another suitable location.

Figure 9A:
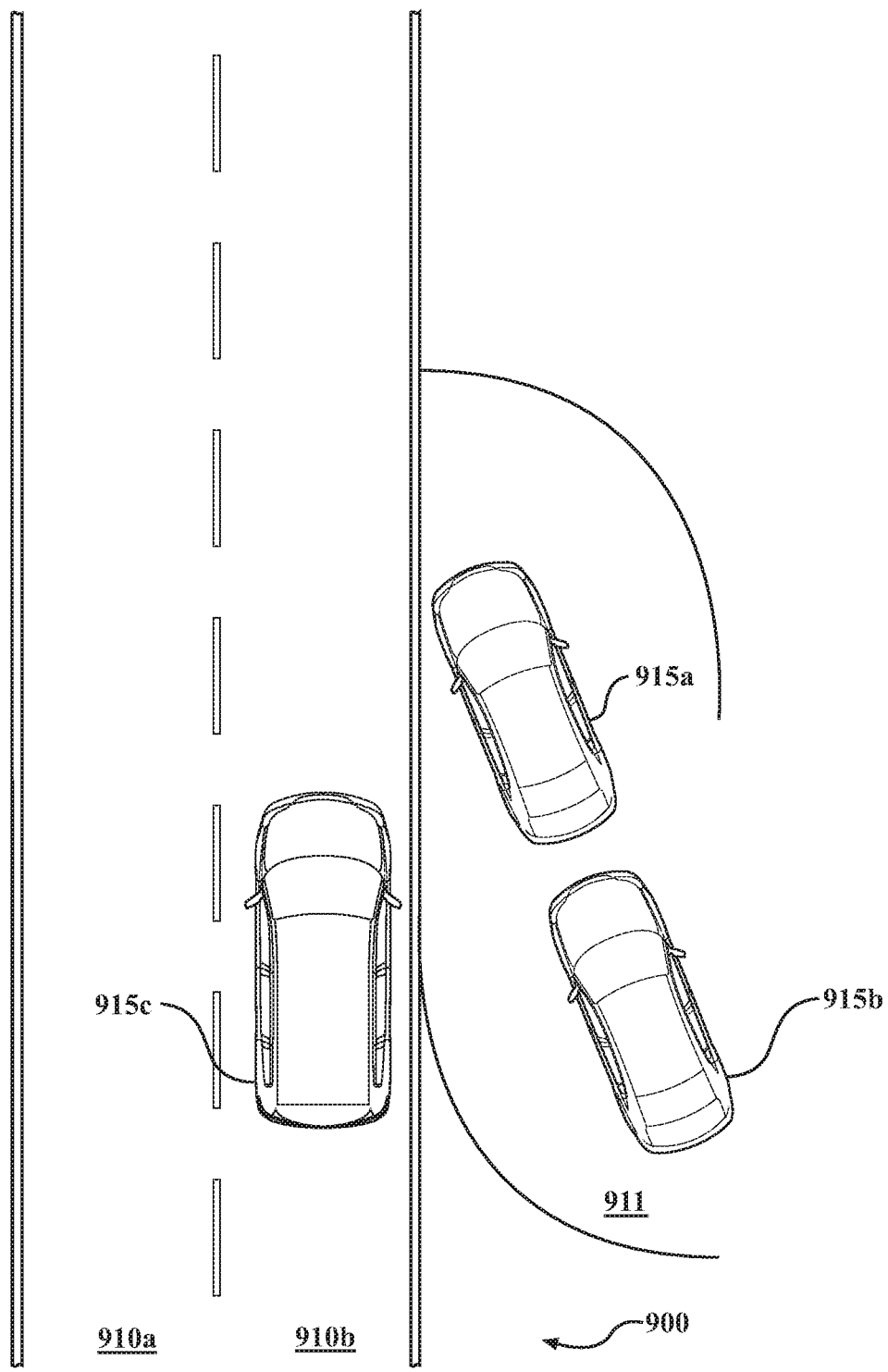
FIGS. 9a and 9b illustrate how a vehicle platoon may merge onto a highway.

The following module 220 may be configured to generate a vehicle platoon that includes a follower vehicle 915b (illustrated in FIG. 9A) and a leader vehicle 915a (illustrated in FIG. 9A). For purposes of brevity and simplification, the examples described in this patent application all include vehicle platoons of two vehicles (i.e., the follower vehicle 915b and the leader vehicle 915a). However, in practice there is no limit to the number of vehicles that may be part of a vehicle platoon.

The following module 220 may be configured to determine when there is an opportunity to join a vehicle platoon. Depending on the embodiment, the following module 220 of a vehicle 100 may receive a message or signal from the following module 220 of another vehicle 100 indicating that the vehicle 100 is interested or open to forming a vehicle platoon. For example, the following module 220 may broadcast a signal using Bluetooth® or another wireless technology that may be received by the following modules 220 of neighboring vehicles 100.

When the following module 220 receives such a message, the following module 220 may alert or notify the operator of the vehicle of the opportunity to form or join a vehicle platoon. For example, the following module 220 may display a prompt on a display associated with the vehicle 100. The display may identify or show an image of the leader vehicle 915a, and may ask the operator to confirm whether they wish to follow the identified leader vehicle. 915a. Other methods for notifying an operator of a vehicle may be used.

If the operator indicates that they would like to follow the vehicle 915a, the following module 220 may transmit a message to the corresponding following module 220 of the leader vehicle. 915a. In response, the following module 220 may send the following module 220 of the follower vehicle 915b what is referred to herein as vehicle status data 280. The vehicle status data 280 may include various data related to the status or operation of the leader vehicle 915a that may be used by the follower vehicle 915b to follow the leader vehicle 915a. The vehicle status data 280 may include the current speed of the leader vehicle 915a, yaw of the leader vehicle 915a, brake status of the leader vehicle 915a, and a current destination of the leader vehicle 915a (if any). Other information may be included such as a time stamp, a road curvature, a lane width, a lane offset, and a road clothoid. Depending on the implementation, the following module 220 of the leader vehicle 915a may transmit the vehicle status data 280 at a periodic rate to the following module 220 of the follower vehicle 915b. The rate may be every second, five seconds, etc. Alternatively, the following module 220 of the leader vehicle 915a may only transmit the vehicle status data 280 when there is a change to the vehicle status data 280 (e.g., a change in speed or brake status).

The following module 220 may be further configured to capture and/or collect sensor data 260 regarding the leader vehicle 915a (or any vehicle in front of the follower vehicle 915b in the platoon). The sensor data 260 may include data collected from sensors such as cameras, LiDAR sensors, ultrasound sensors, or any other sensor typically associated with vehicles 100. The sensors may be part of the sensor system 120 of the vehicle. Depending on the embodiment, the sensor data 260 may be collected about or around the rear of the leader vehicle 915a. For example, the sensor data 260 may capture the license plate associated with the leader vehicle 915a, as well as the status of the brake lights and turn signals associated with the vehicle 915a.

The following module 220 of the follower vehicle 915b may use the vehicle status data 280 and the sensor data 280 to follow the leader vehicle 915a and maintain a following distance from the leader vehicle 915a. For example, the following module 220 of the follower vehicle 915b may sets its speed based on the speed indicated by the vehicle status data 280, and may use the sensor data 280 to ensure that it remains at least the following distance behind the leader vehicle 915a. In addition, the following module 220 of the follower vehicle 915b may monitor the status of the brake lights of the leader vehicle 915a in the sensor data 260 so that it may quickly react to any observed braking by the leader vehicle 915a. The following module 220 may further periodically review the license plate indicated by the sensor data 260 to verify that the follower vehicle 915b is still following the correct leader vehicle 915a.

In some embodiments, the following module 220 may use the sensor data 260 to build what is referred to as a feature vector for the leader vehicle 915a. The feature vector may include features of the leader vehicle 915a such as the dimensions of the leader vehicle, 915a, the color of the leader vehicle 915a, the license plate of the leader vehicle 915a, etc. Other features may be used. The follower module 220 may then use the feature vector to determine if a vehicle that is in front of the follower vehicle 915b is the leader vehicle 915a.

In the event that the follower vehicle 915b becomes lost or is behind a vehicle that is not the leader vehicle 915a, the following module 220 may send a message to the leader vehicle 915a indicating that it is lost. In response, the following module 220 of the leader vehicle 915a may transmits location data 290 to the following module 220 of the follower vehicle 915b. The follower vehicle 915b may then locate the leader vehicle 915a using the location data 290. The location data 290 may include the location of the leader vehicle 915a and may be determined by the following module 220 using GPS or other location determination technology.

The lane change module 225 may be configured to allow the follower vehicle 915b and the leader vehicle 915a to change lanes while remaining in the vehicle platoon. An operator of the leader vehicle 915a may determine to change lanes from a current lane to an adjacent lane. Depending on the embodiment, the operator may be a human operator or one or more autonomous vehicle components.

The lane change module 225 may determine that the leader vehicle 915a has determined to change lanes, and in response, the lane change module 225 may turn on the turn signal of the leader vehicle 915a and may transmit a message (using Bluetooth® or other wireless technology) to the lane change module 225 of the following vehicle 915b. The lane change module 225 of the following vehicle 915b may receive the message, and in response, may determine whether the adjacent lane is clear of other vehicles 100. For example, the lane change module 225 of the follower vehicle 915b may collect sensor data 260 from the adjacent lane, and may determine if there are no vehicles 100 (or other objects) in the adjacent lane that would prevent the follower vehicle 915b from changing lanes.

If the adjacent lane is empty, the lane change module 225 may transmit a message to the lane change module 225 of the leader vehicle 915a that indicates that the follower vehicle 915b is going to change lanes. The follower vehicle 915b may activate its turn signal, and the leader vehicle 915a and the follower vehicle 915b may begin to change lanes substantially simultaneously.

In the event that the lane change module 225 of the follower vehicle 915b determines that the adjacent lane is not clear for the follower vehicle 915b to change lanes, the lane change module 225 may either wait until the lane becomes clear, or may stop following the leader vehicle 915a so that the leader vehicle 915a may change lanes. In such an embodiment, the lane change module 225 may transmit a message to the leader vehicle 915a that it is no longer following the leader vehicle 915b. If the follower vehicle 915b is semi-autonomous, the operator or driver of the follower vehicle 915b may take control of the follower vehicle 915b (i.e., transition from a semi-autonomous mode to a manual mode) before the follower vehicle 915b stops following the leader vehicle 915a.

Figure 7A:
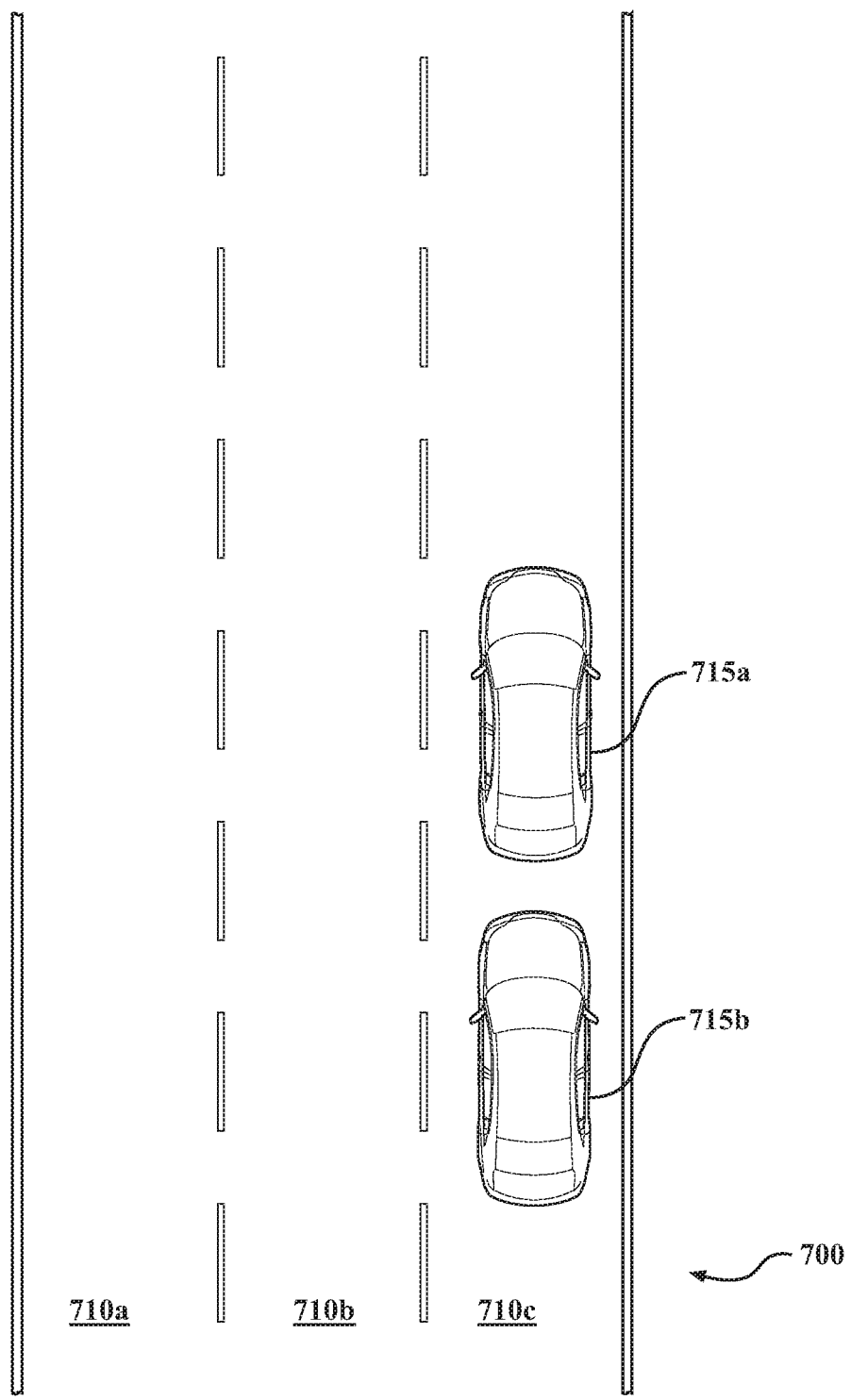
FIGS. 7a-7c illustrate how a vehicle platoon may change lanes.
Figure 7B:
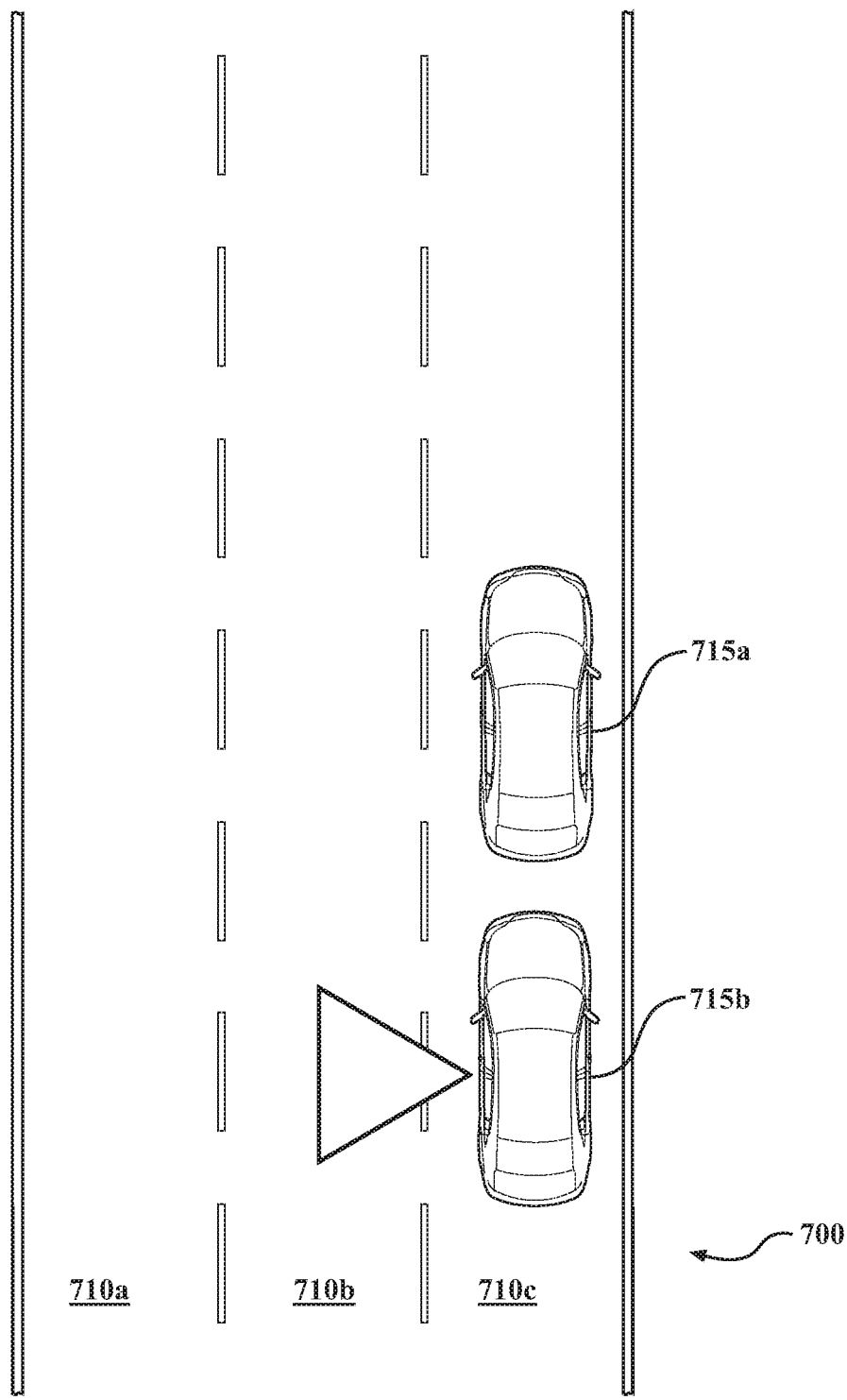
Figure 7C:
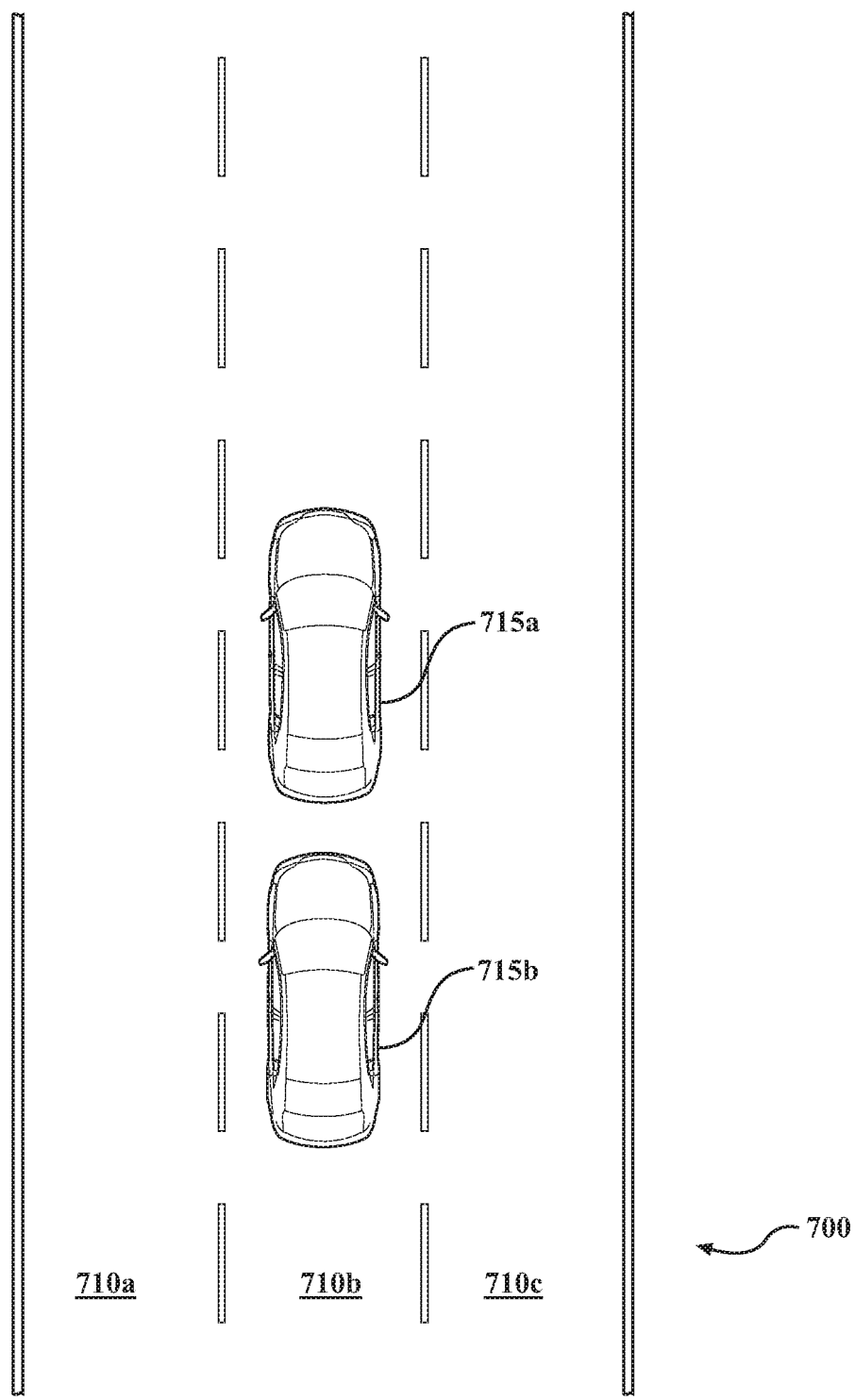

For example, FIGS. 7a-7c illustrate how a vehicle platoon that includes a vehicle 715a and a vehicle 715b may change lanes. In the example shown in FIG. 7a, the vehicle 715a is the leader vehicle 915a and the vehicle 715b is the follower vehicle 915b. The vehicles 715a and 715b are traveling in a lane 710c of a highway 700. The highway also includes a lane 710a and a lane 710b. The vehicle 715a may determine to change lanes to the lane 710b. In response, the lane change module 225 transmits a message to the vehicle 715b to change lanes to the lane 710b.

Continuing to FIG. 7b, the lane change module 225 collects sensor data 260 from the lane 710b and determines that the lane 710b is clear. In response, the lane change module 225 transmits a message to the leader vehicle 715a that it is safe to change lanes to the lane 710b. Continuing to FIG. 7c, the vehicles 715a and 715b have changed lanes to the lane 710b.

The lane change module 225 may be further configured to determine when an object has come between the follower vehicle 915b and the leader vehicle 915a. For example, as described above, the follower vehicle 915b maintains a following distance between the follower vehicle 915b and the leader vehicle 915a. At some point in time, an object such as a motorcycle may have entered the space between the follower vehicle 915b and the leading vehicle 915a. In such cases, when the lane change module 225 of the follower vehicle 915b learns that the leader vehicle 915a wants to change lanes, the lane change module 225 may determine if there is a motorcycle between the follower vehicle 915b and the leader vehicle 915a. If there is, the lane change module 225 of the follower vehicle 915b may either wait until the motorcycle has moved, or may stop following the leader vehicle 915a and the operator of the follower vehicle 915b may retake control of the follower vehicle 915b. If the motorcycle moves, the leader vehicle 915a and the follower vehicle 915b may change lanes as described above.

For example, FIGS. 8a-8d illustrate how a vehicle platoon that includes a vehicle 815a and a vehicle 815b may change lanes in the presence of one or more objects. In the example shown in FIG. 8a, the vehicle 815a is the leader vehicle 915a and the vehicle 815b is the follower vehicle 915b. The vehicles 815a and 815b are traveling in a lane 810b of a highway 800. The highway also includes a lane 810a and a lane 810c. The vehicle 815a may determine to change lanes to the lane 810c. In response, the lane change module 225 transmits a message to the vehicle 815b to change lanes to the lane 810c.

Figure 8A:
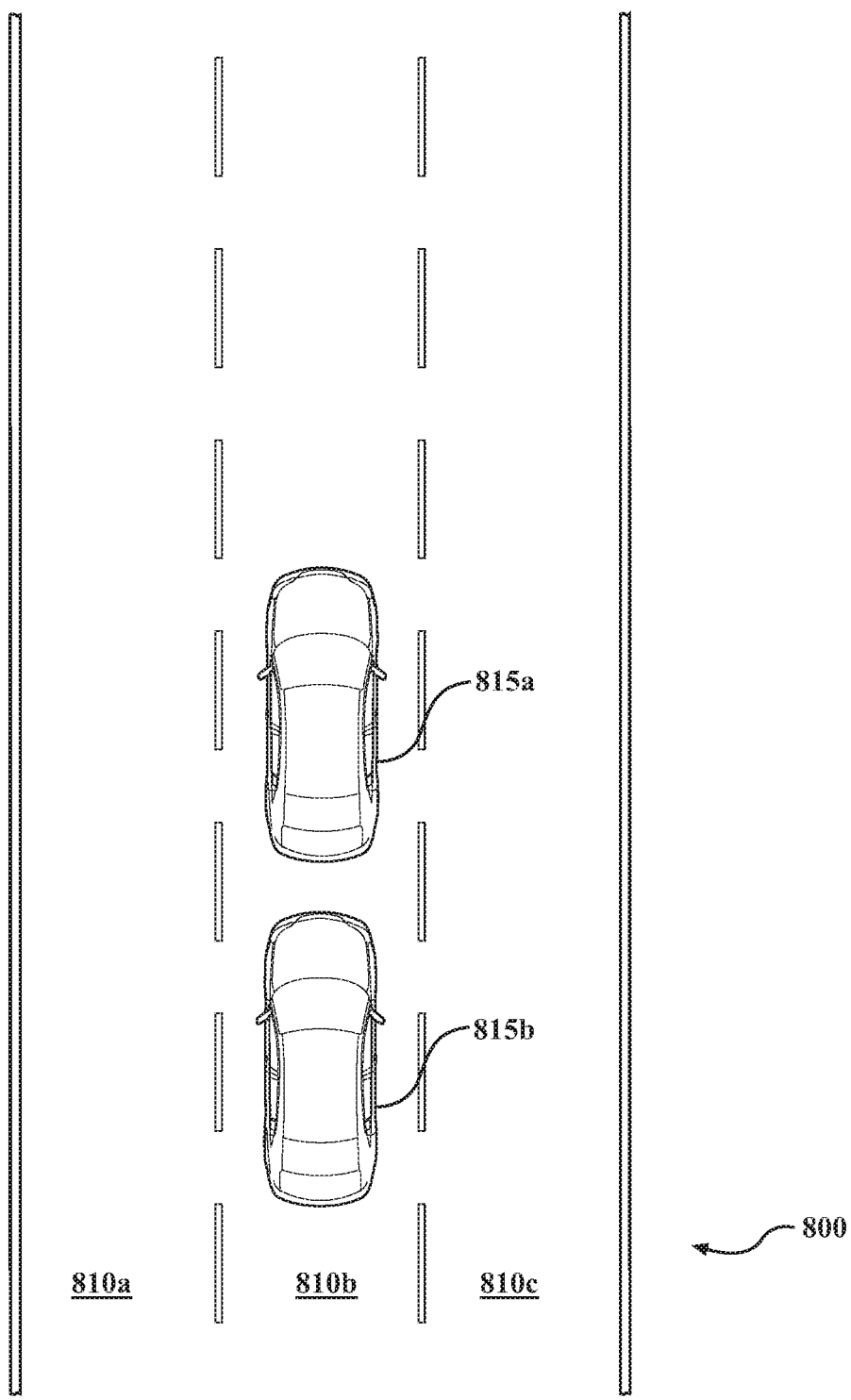
FIGS. 8a-8d illustrate how a vehicle platoon may change lanes in the presence of one or more objects.
Figure 8B:
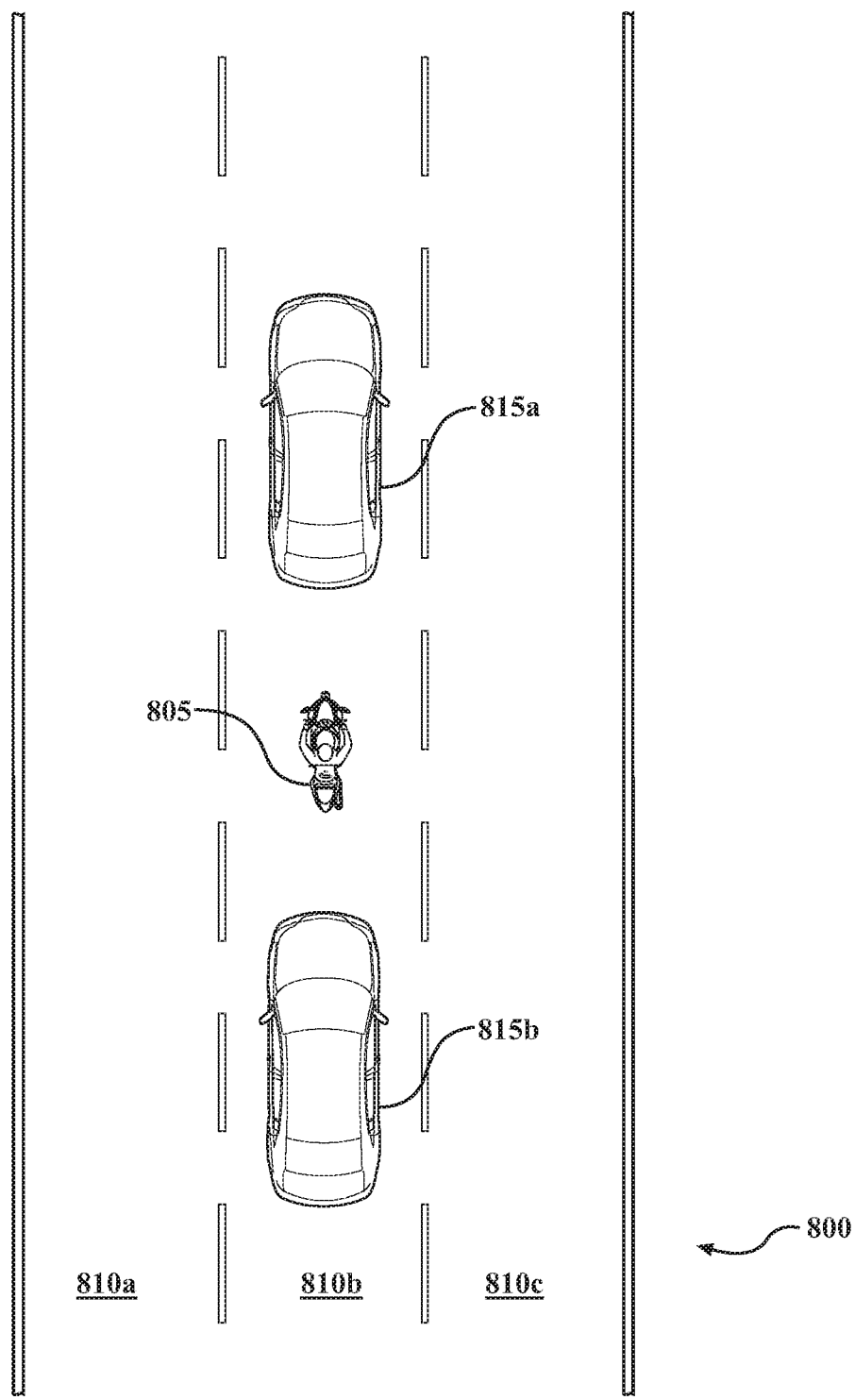

Continuing to FIG. 8b, a motorcycle 805 has suddenly entered the space between the vehicle 815b and the vehicle 815a before the vehicles 815a and 815b were able to change lanes. Accordingly, the lane change module 225 may detect the motorcycle 805 using sensor data 260, and may determine to wait to change lanes.

Figure 8C:
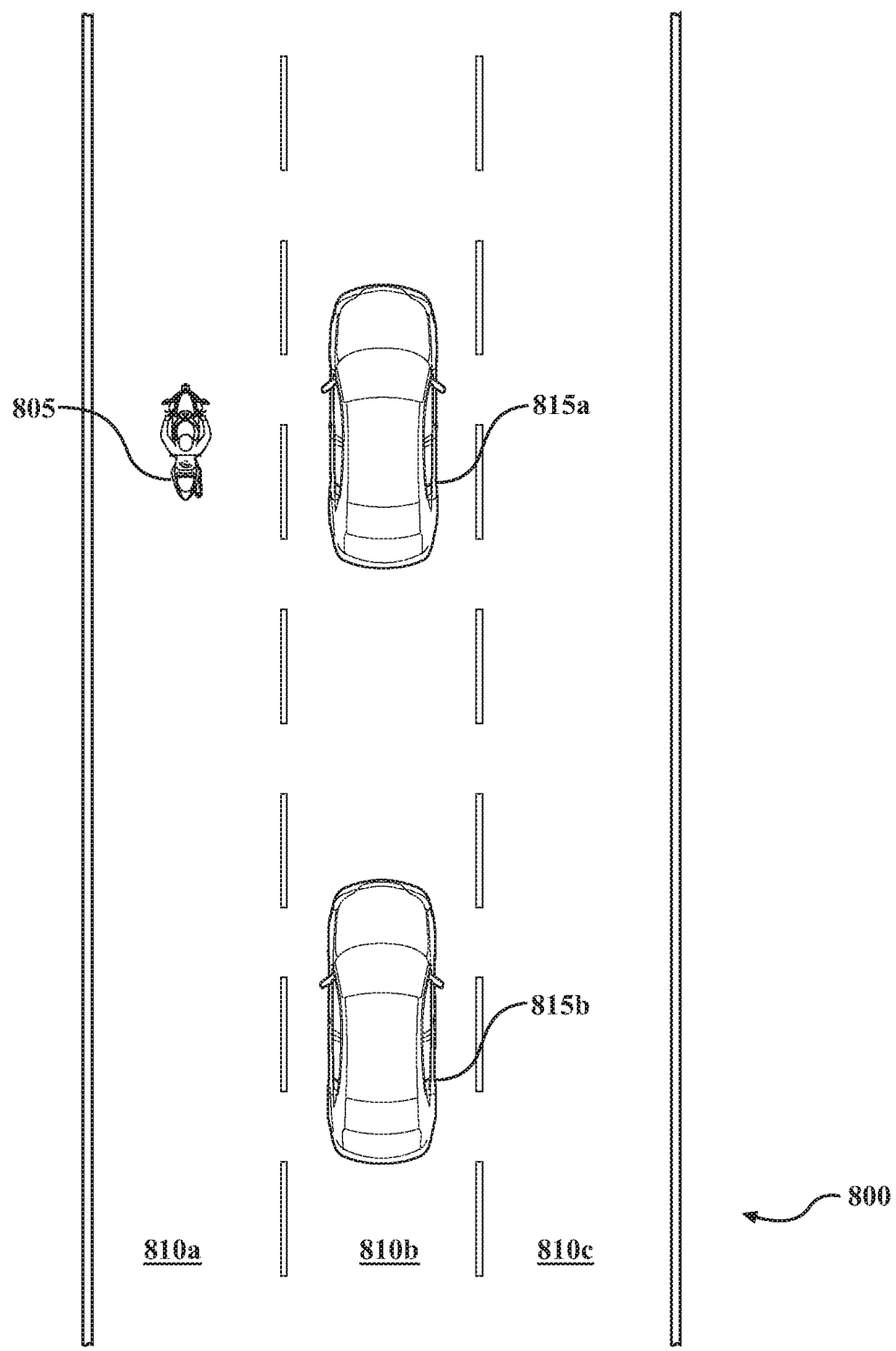
Figure 8D:
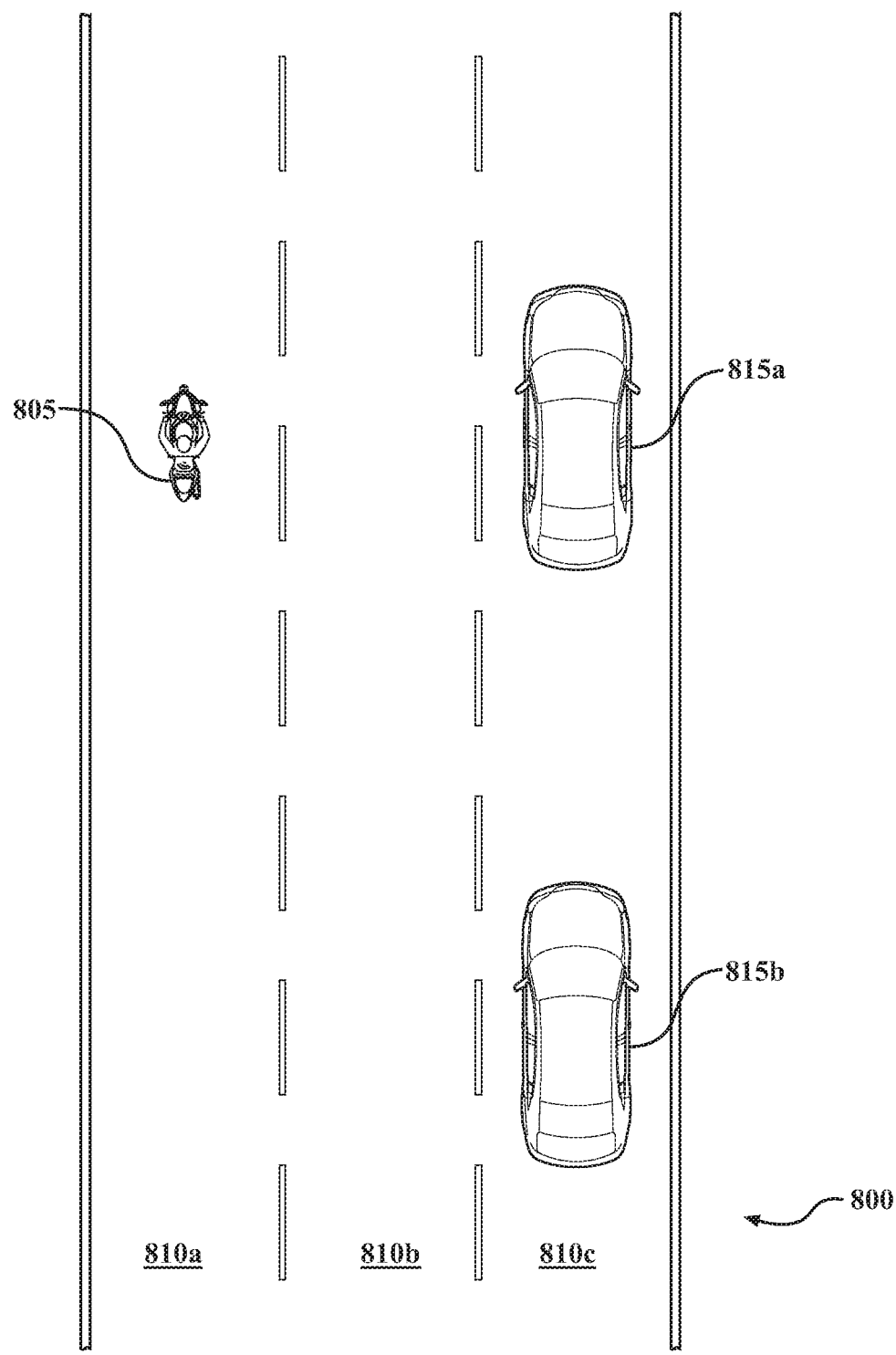

Continuing to FIG. 8c, after some period of time, the motorcycle 805 has moved into the lane 810a and is now no longer between the vehicle 815b and the vehicle 815a. Continuing to FIG. 8d, the vehicles 815a and 815b have changed lanes to the lane 810c in response to the motorcycle 805 moving to the lane 810a.

The lane change module 225 may be configured to allow the follower vehicle 915b and the leader vehicle 915a to merge onto a highway while remaining in the vehicle platoon. An operator of the leader vehicle 915a may determine to merge onto a lane of a highway from a merging lane. Depending on the embodiment, the operator may be a human operator or one or more autonomous vehicle components.

The lane change module 225 may determine that the leader vehicle 915a has determined to merge onto a highway, and in response, the lane change module 225 may turn on its turn signal and may transmit a message (using Bluetooth® or other wireless technology) to the lane change module 225 of the follower vehicle 915b. The lane change module 225 of the follower vehicle may receive the message, and in response, may determine whether the follower vehicle 915b can merge. For example, the lane change module 225 of the follower vehicle 915b may collect sensor data 260 from the highway, and may determine if there are any approaching vehicles 100 (or other objects) that might prevent the follower vehicle 915b from merging.

If the follower vehicle 915b can merge, the lane change module 225 may transmit a message to the lane change module 225 of the leader vehicle 915a that indicates that the follower vehicle 915b is going to merge. The follower vehicle 915b may activate its turn signal, and the leader vehicle 915a and the follower vehicle 915b may each increase their speed and may begin to merge onto the highway substantially simultaneously.

In the event that lane change module 225 of the follower vehicle 915b determines that the follower vehicle 915b can't merge due to an approaching vehicle, the lane change module 225 may stop following the leader vehicle 915a so that the leader vehicle 915a may merge. In such an embodiment, the lane change module 225 may transmit a message to the leader vehicle 915a that it is no longer following the leader vehicle 915a. If the follower vehicle 915b is semi-autonomous, the operator or driver of the follower vehicle 915b may take control of the follower vehicle 915b and may merge onto the highway when it is safe to do so. Once on the highway, the follower vehicle 915b may approach the leader vehicle 915a and may return to following the leader vehicle 915a if desired.

Figure 9B:
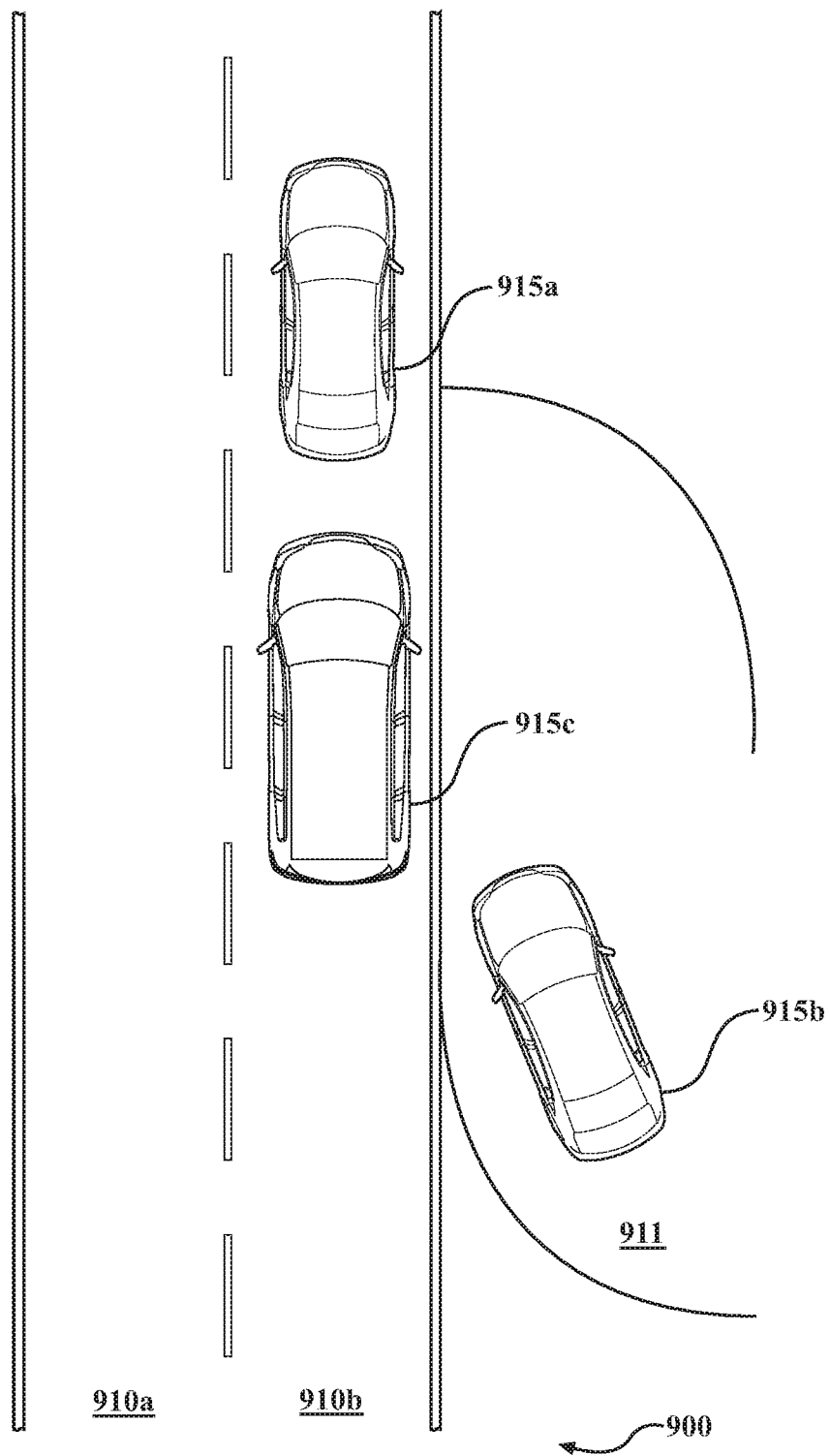

For example, FIGS. 9a and 9b illustrate how a vehicle platoon that includes a vehicle 915a and a vehicle 915b may merge onto a highway. In the example shown in FIG. 9a, the vehicle 915a is the leader vehicle and the vehicle 915b is the follower vehicle. The vehicles 915a and 915b are traveling in a merging lane 911 to enter a highway 900. The highway 900 includes a lane 910a and a lane 910b. The vehicle 915a may determine to merge into the lane 910b. In response, the lane change module 225 transmits a message to the vehicle 915b to merge into the lane 910b. The lane change module 225 of the vehicle 915b may use the sensor data 260 to determine that there is a vehicle 915c traveling in the lane 910b that may prevent the vehicle 915b from merging into the lane 910b.

Continuing to FIG. 9b, the lane change module 225 has stopped following the leader vehicle 915a, and the leader 915a has merged into the lane 910b. After the operator of the vehicle 915b determines that the vehicle 915c has passed, the operator may increase the speed of the vehicle 915b and may merge into the lane 910b.

The intersection module 230 may allow the vehicles 100 of the vehicle platoon to completely pass through an intersection with a traffic light. As may be appreciated, vehicle platoons having many members may have a difficult time passing through an intersection without at least some portion of the vehicle platoon becoming separated due to a traffic light changing states. For example, a vehicle platoon may include eight vehicles 100. When the leader vehicle 915a of the platoon approaches the intersection, a state of the traffic light may be "go" or green. Accordingly, the leader vehicle 915a may begin to drive through the intersection, followed by the seven other vehicles 100 in the platoon. At some point in time, after the fourth vehicle 100 in the platoon exits the intersection, the traffic light may change states to "stop" or red. Accordingly, the fifth vehicle, and all subsequent vehicles 100, are forced to stop at the intersection and stop following the vehicle platoon.

To solve the above mentioned problem, when a leader vehicle 915a in the platoon approaches an intersection with a traffic light, the intersection module 230 may receive traffic-light information 265. The traffic-light information 265 may include information such as the current state of the traffic light in the lane that the vehicle platoon is traveling (e.g., go or stop), and an indication of how much time that the traffic light will remain in the current state. Other information may be included.

If the traffic-light information 265 indicates that the traffic light is in the stop state, the intersection module 230 may cause the leader vehicle 915a to stop at the intersection.

Depending on the implementation, the intersection module 230 may further transmit a message to the other vehicles 100 in the platoon to stop.

If the traffic-light information 265 indicates that the traffic light is in the go state, the intersection module 230 may request vehicle status data 280 from the last vehicle in the platoon. The requested vehicle status data 280 may include the current speed and position of the vehicle. Alternatively, the requested vehicle status data 280 may include the position of the last vehicle in the platoon, and the intersection module 230 may infer the speed of the last vehicle from the speed of the first vehicle.

Based on the time remaining until the traffic light changes to the stop state and the position and velocity of the last vehicle, the intersection module 230 may determine if the last vehicle will reach the intersection before the traffic light changes to the stop state. If the intersection module 230 determines that the last vehicle will not reach the intersection before the traffic light changes, the intersection module 230 may cause the lead vehicle (and the rest of the platoon) to stop at the intersection. Otherwise, the intersection module 230 may instruct the lead vehicle (and the other vehicles 100 in the platoon) to continue through the intersection.

Figure 3:
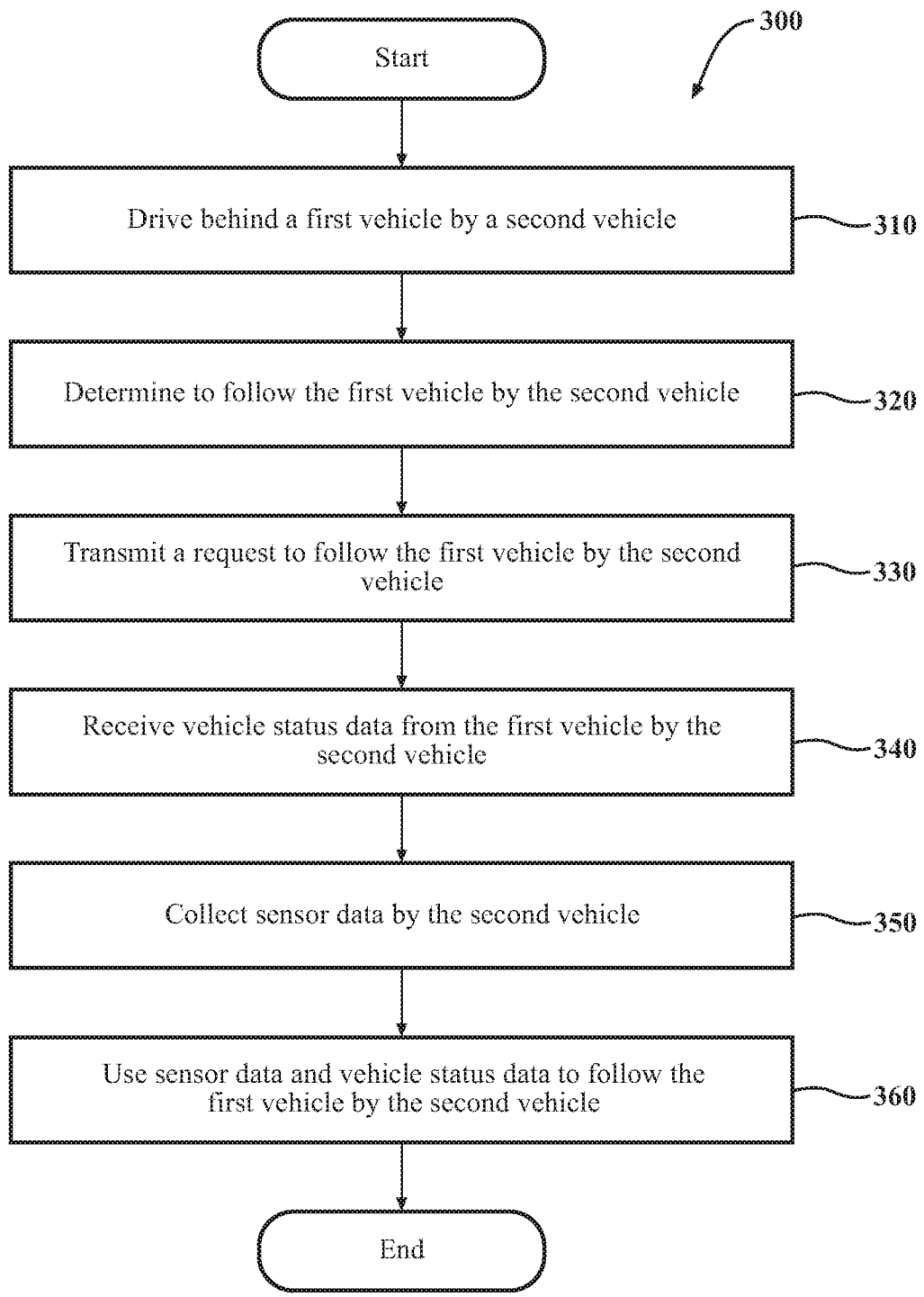
FIG. 3 illustrates a flowchart of a method that is associated with following a leader vehicle by a follower vehicle.

Additional aspects of vehicle platooning is discussed in relation to FIG. 3. FIG. 3 illustrates a flowchart of a method 300 that is associated with following a leader vehicle 915a by a follower vehicle 915b. The method 300 will be discussed from the perspective of the vehicle platooning system 170 of FIGS. 1 and 2. While the method 300 is discussed in combination with the vehicle platooning system 170, it should be appreciated that the method 300 is not limited to being implemented within the vehicle platooning system 170 but is instead one example of a system that may implement the method 300.

At 310, a second vehicle drives behind a first vehicle. The second vehicle may be a follower vehicle 915b and the first vehicle may be a leader vehicle 915a in a vehicle platoon. The first vehicle may be an autonomous vehicle, or may have an operator (i.e., driver). The second vehicle may have an operator and may be a semi-autonomous vehicle At 320, the second vehicle may determine to follow the first vehicle. The following module 220 of the vehicle platooning system 170 may ask the operator of the vehicle if they would like to follow the first vehicle. For example, the following module 220 may display a prompt that identifies the first vehicle as a candidate to follow. The operator may then affirm that they would like to follow the first vehicle.

At 330, the following module 220 of the second vehicle transmits a request to follow the first vehicle. Depending on the embodiment, the request may identify the second vehicle to the first vehicle. The request may be transmitted to the following module 220 of the first vehicle.

At 340, the following module 220 of the second vehicle receives vehicle status data 280 data from the following module of the first vehicle. The vehicle status data 280 may have been transmitted by the following module 220 in response to the request to follow. The vehicle status data 280 may include information about the first vehicle that may be used by the following module 220 of the second vehicle to follow the first vehicle. The information may include the current speed of the first vehicle, vehicle, a current direction of the first vehicle, vehicle, a braking or turn signal status of the first vehicle, vehicle, and a destination of the first vehicle. In some embodiments, the following module 220 may continuously receive the vehicle status data 280 from the first vehicle as long as the second vehicle is following the first vehicle. For example, the following module 220 may transmit the vehicle status data 280 every ten seconds, twenty second, etc. Alternatively or additionally, the following module 220 may only transmit the vehicle status data 280 when there has been a change to the vehicle status data 280 (e.g., after the first vehicle changes speed or activates its brakes).

At 350, the following module 220 of the second vehicle collects sensor data 260. The sensor data 260 may be collected by one or more sensors of the second vehicle such as cameras or LiDAR sensors. Other types of sensors may be supported. The collected sensor data 260 may be focused on the rear of the first vehicle. Depending on the embodiment, the following module 220 may use the collected sensor data 260 to generate a feature vector that may be used to identify the first vehicle by the second vehicle. Similar to the vehicle status data 280, the following module 220 of the second vehicle may continuously collect and refresh the sensor data 260.

At 360, the following module 220 of the second vehicle may use the sensor data 260 and vehicle status data 280 to follow the first vehicle. In some implementations, the following module 220 may follow the first vehicle by following the movement of the first vehicle as indicated by the sensor data 260 and vehicle status data 280 and adjusting the various steering components, acceleration components, and braking components such that the second vehicle remains within a following distance behind the first vehicle. While following the first vehicle, vehicle, the second vehicle may substantially control the operation of the second vehicle (i.e., operate in an autonomous mode or a semi-autonomous mode), allowing the operator of the second vehicle to focus on other non-driving related activities. In the event that the second vehicle can no longer follow the first vehicle, vehicle, the following module 220 may ensure that the operator of the vehicle resumes full control over the second vehicle (i.e., returns to operating in a manual mode).

Figure 4:
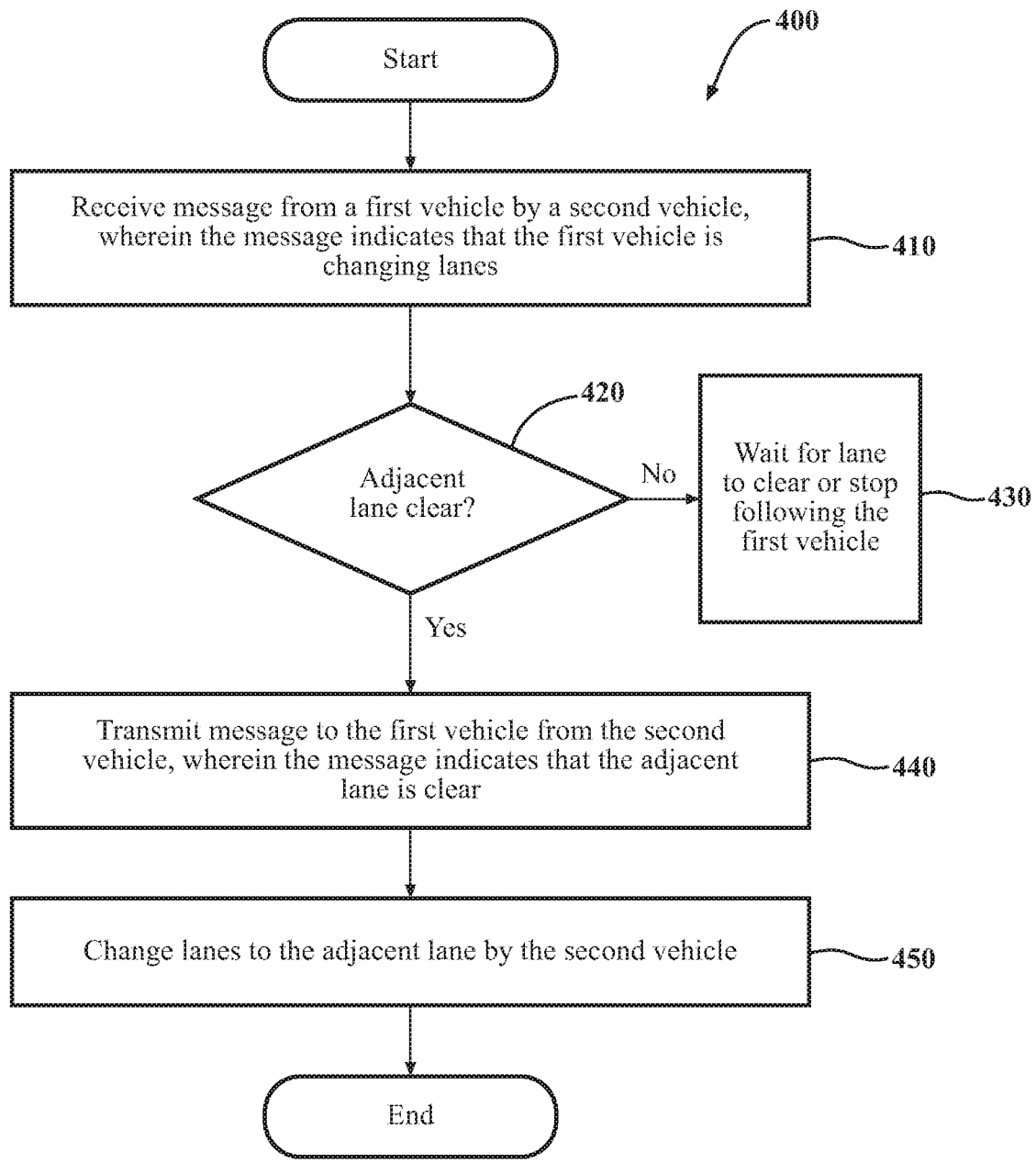
FIG. 4 illustrates a flowchart of a method that is associated with changing a lane by a follower vehicle and a leader vehicle in a vehicle platoon.

Additional aspects of vehicle platooning is discussed in relation to FIG. 4. FIG. 4 illustrates a flowchart of a method 400 that is associated with changing lanes by a follower vehicle 915*b* and a leader vehicle 915*a* in a vehicle platoon. The method 400 will be discussed from the perspective of the vehicle platooning system 170 of FIGS. 1 and 2. While the method 400 is discussed in combination with the vehicle platooning system 170, it should be appreciated that the method 400 is not limited to being implemented within the vehicle platooning system 170 but is instead one example of a system that may implement the method 400.

At 410, the lane change module 225 of a second vehicle receives a message from a first vehicle. The first vehicle may be a leader vehicle 915*a* of a vehicle platoon, and the second vehicle may be a follower vehicle 915*b* of the vehicle platoon. The first vehicle and the second vehicle may be traveling in a lane of a multilane road or highway. The message may indicate that the first vehicle desires to change lanes to an adjacent lane.

At 420, the lane change module 225 of the second vehicle determines whether the adjacent lane is clear such that the second vehicle can change lanes. The second vehicle may determine that the adjacent lane is clear based on sensor data 260 collected from the adjacent lane by the second vehicle. For example, the second vehicle may collect data from a blind-spot monitoring sensor, and other sensors, to determine that the adjacent lane is clear. If the adjacent lane is clear, the method 400 may continue at 440. Else, the method 400 may continue at 430.

At 430, the lane change module 225 has determined that the adjacent lane is not clear and that the second vehicle cannot change lanes. In response to the determination, the lane change module 225 may wait a predetermined amount of time (e.g., one minute or five minutes), and may check the sensor data 260 to determine if the adjacent lane has become clear. After which the method 400 may continue to 440.

Alternatively, the second vehicle may determine to stop following the first vehicle 100 so that the first vehicle can merge into the adjacent lane without the second vehicle vehicle. The second vehicle may transmit a message to the first vehicle that it is no longer following the first vehicle, and may return control of the second vehicle to the operator.

At 440, the lane change module 225 may transmit a message to the first vehicle. The message may indicate the second vehicle is ready to change lanes to the adjacent lane and that the adjacent lane is clear.

At 450, the second vehicle may change lanes to the adjacent lane. Depending on the embodiment, the first vehicle and the second vehicle may change lanes to the adjacent lane simultaneously.

Figure 5:
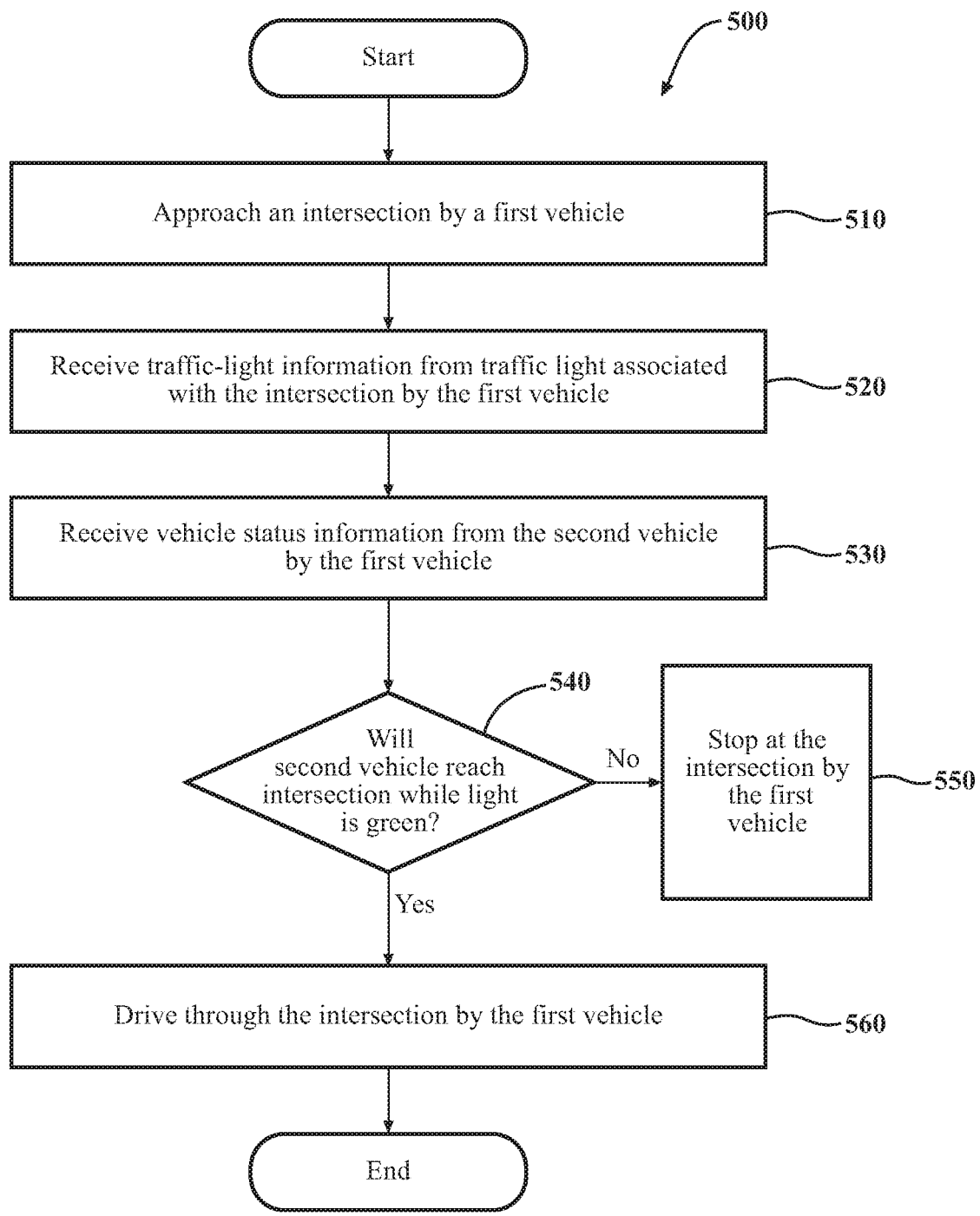
FIG. 5 illustrates a flowchart of a method that is associated with navigating an intersection by a follower vehicle and a leader vehicle in a vehicle platoon.

Additional aspects of vehicle platooning is discussed in relation to FIG. 5. FIG. 5 illustrates a flowchart of a method 500 that is associated with navigating an intersection by a follower vehicle 915*b* and a leader vehicle 915*a* in a vehicle platoon. The method 500 will be discussed from the perspective of the vehicle platooning system 170 of FIGS. 1 and 2. While the method 500 is discussed in combination with the vehicle platooning system 170, it should be appreciated that the method 500 is not limited to being implemented within the vehicle platooning system 170 but is instead one example of a system that may implement the method 500.

At 510, a first vehicle approaches an intersection. The first vehicle may be a leader vehicle 915*a* of a vehicle platoon. The platoon may further include a second vehicle that is the last vehicle in the vehicle platoon. Additional vehicles may be in the vehicle platoon. The intersection may have a traffic light. The traffic light may be in a go state (i.e., green) with respect to a lane that the first vehicle and the second vehicle are traveling in.

At 520, the intersection module 230 of the first vehicle receives traffic-light information 265 from the traffic light associated with the intersection. The traffic-light information 265 includes information indicating how long the traffic light will remain in the go state.

At 530, the intersection module 230 of the first vehicle receives vehicle status data 280 from the second vehicle. The vehicle status data 280 may have been requested by the intersection module 230 and may include information such as the current location and velocity of the second vehicle. Depending on the embodiment, the vehicle status data 280 may include the position of the second vehicle, vehicle, and the velocity of the second vehicle may be inferred from the velocity of the first vehicle because they are in the same vehicle platoon.

At 540, the intersection module 230 of the first vehicle determines whether the second vehicle will reach the intersection while the traffic light remains in the go state. The intersection module 230 may make the determination using the traffic-light information 265 and the vehicle status data 280. As described above, the second vehicle is the last vehicle in the vehicle platoon, and therefore the intersection module 230 is determining whether the entire vehicle platoon can reach the intersection before the traffic light changes from the go state to a stop state (i.e., red).

If the intersection module 230 determines that the second vehicle will reach the intersection while the light is in the go state, the method 500 may continue at 560. Else, the method 500 may continue at 550.

At 550, the first vehicle stops at the intersection. Because it was determined that the second vehicle would reach the intersection before the traffic light changed to the stop state, the first vehicle stopped at the intersection to avoid splitting the vehicle platoon.

At 560, the first vehicle drives through the intersection without stopping. The second vehicle (and any other vehicles 100 in the platoon) also drive through the intersection behind the first vehicle.

Figure 6:
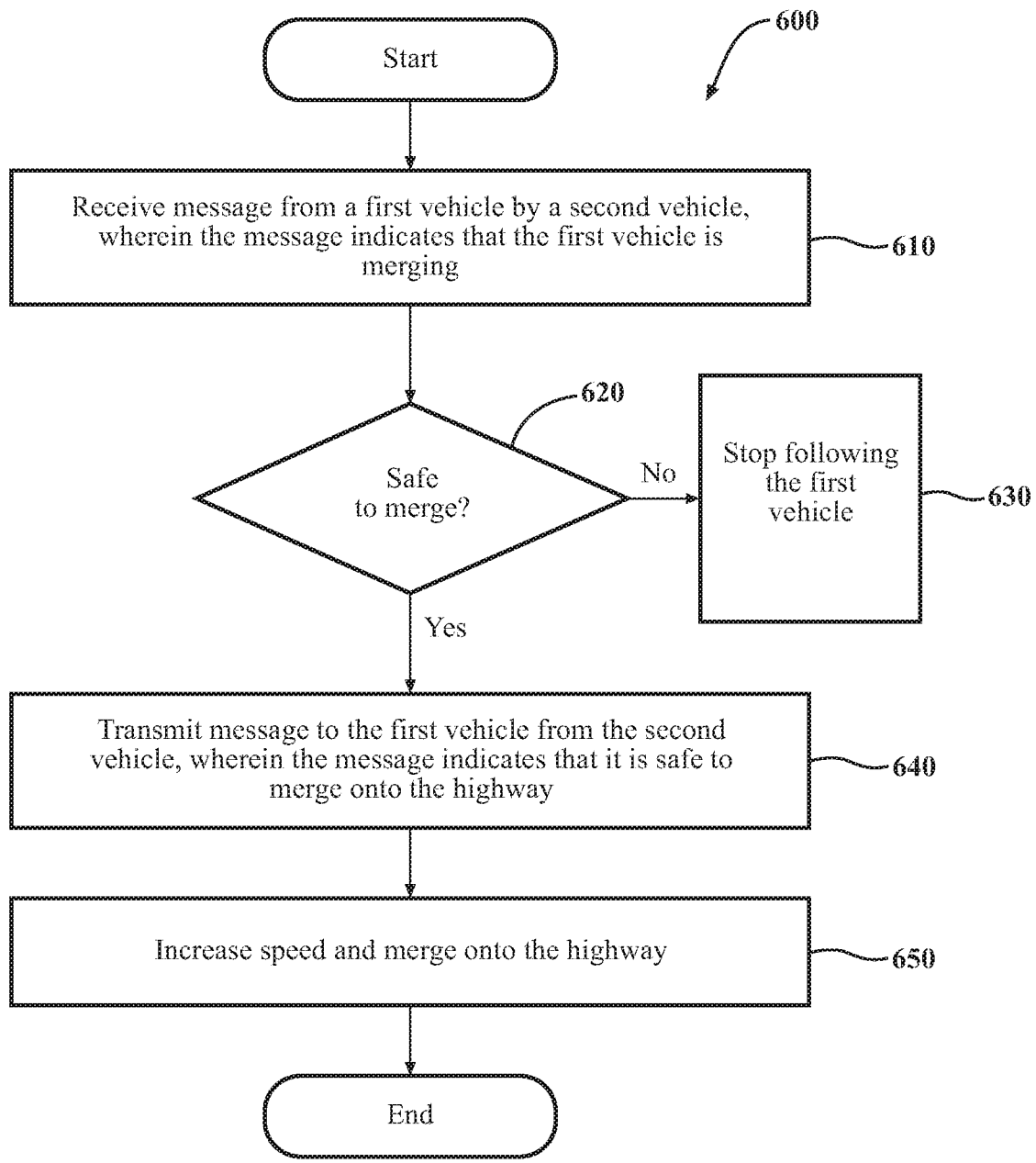
FIG. 6 illustrates a flowchart of a method that is associated with merging onto a highway by a follower vehicle and a leader vehicle in a vehicle platoon.

Additional aspects of vehicle platooning is discussed in relation to FIG. 6. FIG. 6 illustrates a flowchart of a method 600 that is associated with merging onto a highway by a follower vehicle 915*b* and a leader vehicle 915*a* in a vehicle platoon. The method 600 will be discussed from the perspective of the vehicle platooning system 170 of FIGS. 1 and 2. While the method 600 is discussed in combination with the vehicle platooning system 170, it should be appreciated that the method 600 is not limited to being implemented within the vehicle platooning system 170 but is instead one example of a system that may implement the method 600.

At 610, the lane change module 225 of a second vehicle receives a message from a first vehicle. The first vehicle may be a leader vehicle 915a of a vehicle platoon, and the second vehicle may be a follower vehicle 915b of the vehicle platoon. The first vehicle and the second vehicle may be traveling in a merging lane to merge onto a highway. The message may indicate that the first vehicle is about to merge onto the highway from the merging lane.

At 620, the lane change module 225 of the second vehicle determines whether it is safe for the second vehicle to merge onto the highway from the merging lane. The second vehicle may determine that it is safe to merge based on sensor data 260 collected from the highway lane adjacent to the merging lane by the second vehicle. If it is safe to merge, the method 600 may continue at 640. Else, the method 600 may continue at 630.

At 630, the lane change module 225 has determined that it is not safe for the second vehicle to merge. In response, the second vehicle may determine to stop following the first vehicle so that the first vehicle can merge into the highway without the second vehicle. The second vehicle may transmit a message to the first vehicle that it is no longer following the first vehicle, vehicle, and may return control of the second vehicle to the operator.

At 640, the lane change module 225 may transmit a message to the first vehicle. The message may indicate the second vehicle is ready to merge onto the highway.

At 650, the second vehicle may increase its speed and may merge onto the highway. Depending on the embodiment, the first vehicle and the second vehicle may merge substantially simultaneously.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the vehicle platooning system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the vehicle platooning system 170, and/or the autonomous driving module(s) 160 may control some or all of these vehicle systems 140 and, thus, may be partially or fully autonomous.

The processor(s) 110, the vehicle platooning system 170, and/or the autonomous driving module(s) 160 can be operatively connected to communicate with the various vehicle systems 140 and/or individual components thereof. For example, returning to FIG. 1, the processor(s) 110, the vehicle platooning system 170, and/or the autonomous driving module(s) 160 can be in communication to send and/or receive information from the various vehicle systems 140 to control the movement, speed, maneuvering, heading, direction, etc. of the vehicle 100. The processor(s) 110, the vehicle platooning system 170, and/or the autonomous driving module(s) 160 may control some or all of these vehicle systems 140.

The processor(s) 110, the vehicle platooning system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the vehicle platooning system 170, and/or the autonomous driving module(s) 160 can control the direction and/or speed of the vehicle 100. The processor(s) 110, the vehicle platooning system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the vehicle platooning system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for vehicle platooning, comprising:
receiving a first message from a first vehicle by a second vehicle, wherein the first message indicates that the first vehicle has determined to change lanes from a current lane to an adjacent lane, and further wherein the first vehicle and the second vehicle are both traveling in the current lane;
determining that there is an object between the first vehicle and the second vehicle;
in response to a determination that the object is between the first vehicle and the second vehicle, transmitting a second message to the first vehicle from the second vehicle, wherein the second message indicates a presence of the object;
determining to wait to change lanes until the object is no longer between the first vehicle and the second vehicle;
determining that the object is no longer between the first vehicle and the second vehicle;
in response to a determination that the object is no longer between the first vehicle and the second vehicle, transmitting a third message to the first vehicle from the second vehicle, wherein the third message indicates the object is no longer between the first vehicle and the second vehicle; and
changing the lanes to the adjacent lane from the current lane by the second vehicle, wherein the second vehicle changes the lanes to the adjacent lane from the current lane at approximately a same time as the first vehicle.

2. The method of claim 1, further comprising:
driving behind the first vehicle by the second vehicle, wherein the second vehicle includes an operator and is operating in a manual mode;

determining to follow the first vehicle by the second vehicle;

in response to a determination to follow, transmitting a request to follow the first vehicle to the first vehicle from the second vehicle;

in response to the request, receiving vehicle status data from the first vehicle; and using the vehicle status data to follow the first vehicle by the second vehicle, wherein the second vehicle maintains a following distance between the first vehicle and the second vehicle, and further wherein the second vehicle operates in one of an autonomous mode or a semi-autonomous mode while following the first vehicle.

3. The method of claim 2, wherein the determining to follow the first vehicle by the second vehicle comprises receiving an instruction to follow the first vehicle from the operator, and determining to follow the first vehicle in response to the instruction.

4. The method of claim 2, wherein the vehicle status data includes include one or more of a velocity of the first vehicle, a time stamp, a yaw rate of the first vehicle, a road curvature, a lane width, a lane offset, or a road clothoid.

5. The method of claim 2, wherein the receiving the vehicle status data comprises periodically receiving the vehicle status data from the first vehicle.

6. The method of claim 2, further comprising:
collecting sensor data from one or more sensors of the second vehicle; and
using the sensor data and the vehicle status data to follow the first vehicle.

7. The method of claim 2, wherein the sensor data comprise one or more of an image of a license plate of the first vehicle or an image of a back of the first vehicle.

8. The method of claim 2, further comprising:
receiving a fourth message from the first vehicle by the second vehicle, wherein the fourth message indicates that the first vehicle has determined to change the lanes from the current lane to the adjacent lane, and further wherein the first vehicle and the second vehicle are both traveling in the current lane;
determining that the adjacent lane is clear for the second vehicle;
in response to, a determination that the adjacent lane is clear for the second vehicle, transmitting a fifth message to the first vehicle from the second vehicle, wherein the fifth message indicates that the adjacent lane is clear for the second vehicle; and
changing the lanes to the adjacent lane from the current lane by the second vehicle, wherein the second vehicle changes the lanes to the adjacent lane from the current lane at approximately a same time as the first vehicle.

9. The method of claim 1, wherein the object is a motorcycle.

10. A method for vehicle platooning, comprising:
determining to change lanes from a current lane to an adjacent lane by a first vehicle, wherein the first vehicle and a second vehicle are both traveling in the current lane;
in response to a first determination to change the lanes, activating a turn signal of the first vehicle and transmitting a first message to the second vehicle, the first message indicating that the first vehicle has determined to change the lanes;

receiving a second message from the second vehicle at the first vehicle, the second message indicating that an object is between the first vehicle and the second vehicle;

determining to wait to change the lanes until the object is no longer between the first vehicle and the second vehicle;

receiving a third message from the second vehicle at the first vehicle, the third message indicating that the object is no longer between the first vehicle and the second vehicle; and in response to a receipt of the third message, changing the lanes to the adjacent lane from the current lane by the first vehicle, wherein the second vehicle changes the lanes to the adjacent lane from the current lane at approximately a same time as the first vehicle.

11. The method of claim 10, further comprising:
receiving a request to follow at the first vehicle from the second vehicle, wherein the second vehicle is traveling behind the first vehicle;
in response to a receipt of the request to follow, transmitting vehicle status data to the second vehicle from the first vehicle, wherein the second vehicle uses the vehicle status data to maintain a following distance between the first vehicle and the second vehicle;
receiving a fourth message from the second vehicle at the first vehicle, the fourth message indicating that the second vehicle has lost the first vehicle; and
in response to the fourth message, transmitting a location of the first vehicle from the first vehicle to the second vehicle.

12. The method of claim 11, further comprising:
determining to change the lanes from the current lane to the adjacent lane by the first vehicle, wherein the first vehicle and the second vehicle are both traveling in the current lane;
in response to a second determination to change the lanes, activating the turn signal of the first vehicle and transmitting a fifth message to the second vehicle, the fifth message indicating that the first vehicle has determined to change the lanes;
receiving a sixth message from the second vehicle at the first vehicle, the sixth message indicating that the adjacent lane is clear for the second vehicle; and
in response to a receipt of the sixth message, changing lanes to the adjacent lane from the current lane by the first vehicle, wherein the second vehicle changes the lanes to the adjacent lane from the current lane at approximately a same time as the first vehicle.

13. The method of claim 11, wherein at least one of the first vehicle or the second vehicle is an autonomous vehicle or a semi-autonomous vehicle.

14. The method of claim 11, further comprising:
determining to merge onto a highway from a merging lane by the first vehicle, wherein the first vehicle and the second vehicle are both traveling in the merging lane;
in response to the a determination to merge, activating the turn signal of the first vehicle and transmitting a fifth message to the second vehicle, the fifth message indicating that the first vehicle has determined to merge onto the highway;
receiving a sixth message from the second vehicle at the first vehicle, the sixth message indicating that a situation for the second vehicle to merge onto the highway is safe; and
in response to a receipt of the sixth message, increasing a speed of the first vehicle and merging onto the highway from the merging lane, wherein the second vehicle merges onto the highway at approximately a same time as the first vehicle.

15. The method of claim 11, further comprising:
approaching an intersection by the first vehicle, wherein the intersection includes a traffic light, and the traffic light is in a go state;
receiving traffic-light information from the traffic light by the first vehicle, wherein the traffic-light information indicates how much time the traffic light will remain in the go state;
determining whether the second vehicle will arrive at the intersection while the traffic light is in the go state based on the information; and
in response to a determination that the second vehicle will arrive at the intersection while the traffic light is in the go state, causing the first vehicle to drive through the intersection.

16. The method of claim 15, wherein the determining whether the second vehicle will arrive at the intersection while the traffic light is in the go state based on the information comprises:
receiving at least one of a velocity of the second vehicle or a location of the second vehicle; and
determining whether the second vehicle will arrive at the intersection while the traffic light is in the go state based on the information and the at least one of the velocity of the second vehicle or the location of the second vehicle.

17. The method of claim 10, wherein the object is a motorcycle.

18. A system for vehicle platooning, the system comprising:
one or more processors; and
a memory communicably coupled to the one or more processors and storing:
a following module including instructions that when executed by the one or more processors cause the one or more processors to:
drive behind a first vehicle by a second vehicle, wherein the second vehicle is configured to be operated by an operator in a manual mode;
determine to follow the first vehicle by the second vehicle; and
in response to a determination to follow, transmit a request to follow the first vehicle to the first vehicle from the second vehicle;
in response to the request, receive vehicle status data from the first vehicle; and
use the vehicle status data to follow the first vehicle by the second vehicle at a time when the second vehicle maintains a following distance between the first vehicle and the second vehicle, and at a time when the second vehicle operates in one of an autonomous mode or a semi-autonomous mode while following the first vehicle; and
a lane change module including instructions that when executed by the one or more processors cause the one or more processors to:
receive a first message from the first vehicle by the second vehicle, wherein the first message indicates that the first vehicle has determined to change lanes from a current lane to an adjacent lane at a time when the first vehicle and the second vehicle are both traveling in the current lane;
determine that an object is between the first vehicle and the second vehicle;
in response to a determination that there is the object between the first vehicle and the second vehicle, transmit a second message to the first vehicle from the second vehicle, wherein the second message indicates a presence of the object;
determine to wait to change lanes until the object is no longer between the first vehicle and the second vehicle;
determine that the object is no longer between the first vehicle and the second vehicle;
in response to a determination that the object is no longer between the first vehicle and the second vehicle, transmit a third message to the first vehicle from the second vehicle, wherein the third message indicates the object is no longer between the first vehicle and the second vehicle; and
change the lanes to the adjacent lane from the current lane by the second vehicle, wherein the second vehicle changes the lanes to the adjacent lane from the current lane at approximately a same time as the first vehicle.

19. The system of claim 18, wherein the vehicle status data include one or more of a velocity of the first vehicle, a time stamp, a yaw rate of the first vehicle, a road curvature, a lane width, a lane offset, or a road clothoid.

20. The system of claim 18, wherein the instructions to receive the vehicle status data comprise instructions to periodically receive the vehicle status data from the first vehicle.

21. A system, comprising:
a processor; and
a memory storing a lane change module including instructions that when executed by the processor cause the processor to:
determine a presence of an object between a first vehicle and a second vehicle;
determine to wait, until an absence of the presence of the object, to change from a first lane to a second lane;
determine the absence of the presence of the object; and
cause, concurrently with the second vehicle, the first vehicle to change from the first lane to the second lane.

* * * * *

UNITED STATES PATENT AND TRADEMARK OFFICE
CERTIFICATE OF CORRECTION

PATENT NO. : 11,011,064 B2  
APPLICATION NO. : 16/292862  
DATED : May 18, 2021  
INVENTOR(S) : Yumeng Zhou and Jin Kurumisawa Page 1 of 1

It is certified that error appears in the above-identified patent and that said Letters Patent is hereby corrected as shown below:

In the Claims

Column 21, Line 46 Claim 8, delete "to, a" and insert --to a--

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*